United States Patent [19]
McHorse et al.

[11] Patent Number: 6,073,714
[45] Date of Patent: Jun. 13, 2000

[54] VEHICLE CAB SUSPENSION SYSTEM

[75] Inventors: James Vincent McHorse; James T. Atchley, both of Portland, Oreg.

[73] Assignee: Freightliner Corporation, Portland, Oreg.

[21] Appl. No.: 09/257,219

[22] Filed: Feb. 25, 1999

[51] Int. Cl.[7] .................................................. B62D 33/06
[52] U.S. Cl. ..................... 180/89.14; 180/89.13
[58] Field of Search ............................... 180/89.13, 89.14

[56] References Cited

U.S. PATENT DOCUMENTS

| | | |
|---|---|---|
| 2,753,007 | 7/1956 | Read . |
| 2,864,121 | 12/1958 | Imber et al. . |
| 2,901,240 | 8/1959 | Fikse . |
| 2,951,548 | 6/1960 | Crockett et al. . |
| 3,039,557 | 6/1962 | Boyce et al. . |
| 3,146,847 | 9/1964 | Rutman et al. . |
| 3,156,481 | 11/1964 | Dangauthier . |
| 3,380,773 | 4/1968 | Sewelin . |
| 3,393,005 | 7/1968 | Herrmann et al. . |
| 3,448,994 | 6/1969 | King et al. . |
| 4,253,700 | 3/1981 | Di Francescantonio . |
| 4,281,850 | 8/1981 | Studer . |
| 5,044,455 | 9/1991 | Tecco et al. . |
| 5,161,818 | 11/1992 | Kopieczek . |
| 5,249,652 | 10/1993 | Leitzman et al. . |
| 5,299,651 | 4/1994 | Wilson . |
| 5,368,118 | 11/1994 | Hoefle . |
| 5,590,733 | 1/1997 | Ljungholm et al. .................. 180/89.14 |

*Primary Examiner*—Kenneth R. Rice
*Attorney, Agent, or Firm*—Klarquist Sparkman Campbell Leigh & Whinston, LLP

[57] ABSTRACT

A suspension system for a vehicle cab which includes springs supporting the rear end of the cab over the frame. A sway resisting device including a torsion, or sway, bar is coupled to the frame and has arms extending outwardly therefrom which connect to the cab. The sway bar is restrained against movement laterally of the truck and through its connection with the cab inhibits lateral movement of the cab relative to the frame. The torsional resistance in the sway bar resists side-to-side roll of the cab relative of the frame.

26 Claims, 5 Drawing Sheets

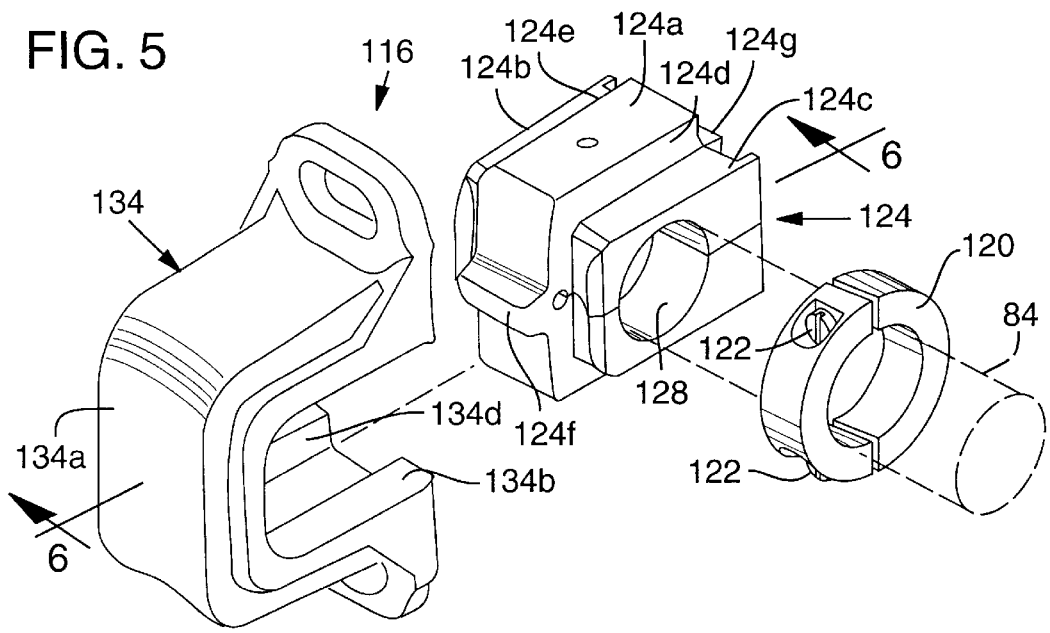
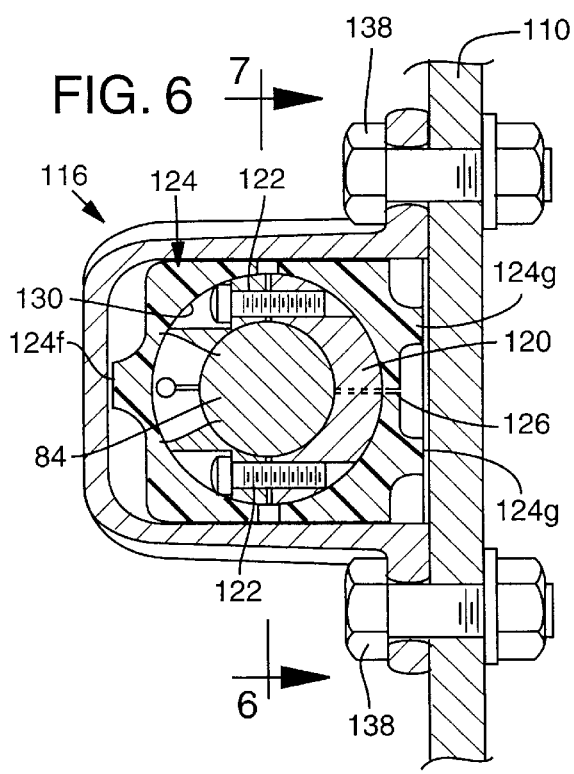
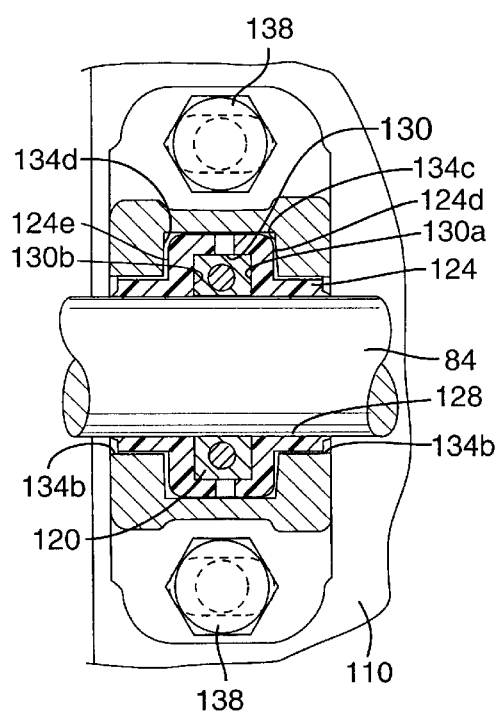

VEHICLE CAB SUSPENSION SYSTEM

BACKGROUND OF THE INVENTION

The present invention relates to a vehicle cab suspension system, and more particularly to such a system which incorporates a sway resisting device including a torsion bar operable to resist side-to-side roll and side-to-side shifting of the cab during operation.

Vehicle cabs, and particularly cab over engine (COE) truck cabs, generally are supported on the vehicle frame through vibration isolating suspension systems. Generally these include springs which isolate truck frame vibration from the cab where the operator sits.

A problem with suspension systems in the past is that although springs have been positioned adjacent opposite sides of the frame on which the cab is supported, the springs often have been insufficient to withstand cab rolling forces and lateral shifting forces, and thus excessive movement of the cab relative to the frame has occurred which is uncomfortable for the operator.

It is desirable to provide what may be termed a relatively soft suspension to minimize vibration transmission from the frame to the cab, but it also is necessary to provide some means for minimizing side-to-side roll and side-to-side lateral shifting of the cab during operation.

SUMMARY OF THE INVENTION

A sway resisting device including a torsion, or sway, bar in accordance with the present invention, provides an effective and efficient mechanism for permitting desired vibration isolation through the springs while resisting vertical movement of one side of the cab relative to the other to limit cab roll and inhibiting lateral movement of the cab relative to the frame.

In accordance with one specific aspect of the present invention, the suspension system includes a torsion, or sway, bar operable to resist vertical movement of one side of the cab relative to the other side of the cab and to inhibit lateral movement of the cab relative to the frame. The system comprises a torsion bar having an elongate central section extending transversely of the frame and opposed leg sections extending at substantial angles outwardly from opposite ends of the central section, with outer end portions of the leg sections interposed between cab supporting springs and the cab and being coupled to the cab during operation. A mounting couples the sway bar to the frame to permit rotation about the longitudinal axis of the central section while inhibiting movement laterally of the frame.

In accordance with a more specific aspect of the present invention, the mounting includes a bushing having a bore through which a portion of the central section of the torsion bar extends and a housing in which the bushing is mounted with the housing secured relative to the frame. The bushing is mounted in the housing to permit a limited amount of shifting longitudinally relative to the frame to accommodate movement of the sway bar during operation. With such mounting the system does not need loose linkage connections which may have been used in prior systems and which could permit unwanted movement of the cab relative to the frame.

The torsion bar may have a projection on the central section thereof and the bushing has a groove therein to receive such projection, with the groove having laterally spaced side margins confining the projection and torsion bar against movement laterally of the frame.

In a preferred embodiment of the invention, a substantially upright line-of-action extends upwardly through one of the springs and one of the support members to which the cab is secured, and an end portion of a leg of the sway bar is secured to the support member along said line-of-action. This provides a compact, efficient operating interconnection between the elements to produce the desired effects of the torsion bar of this invention.

These and other features, objects and advantages of the present invention will become more apparent with reference to the following description and drawings.

BRIEF DESCRIPTION OF THE DRAWINGS

FIG. 5 is an enlarged exploded view of a mounting for a portion of a sway bar in the suspension system;

FIG. 6 is a cross sectional view of the assembled mounting taken generally along the line 6—6 in FIG. 5;

FIG. 7 is a cross section view taken generally along the line 7—7 in FIG. 6.

DETAILED DESCRIPTION OF PREFERRED EMBODIMENT

Figure 1:
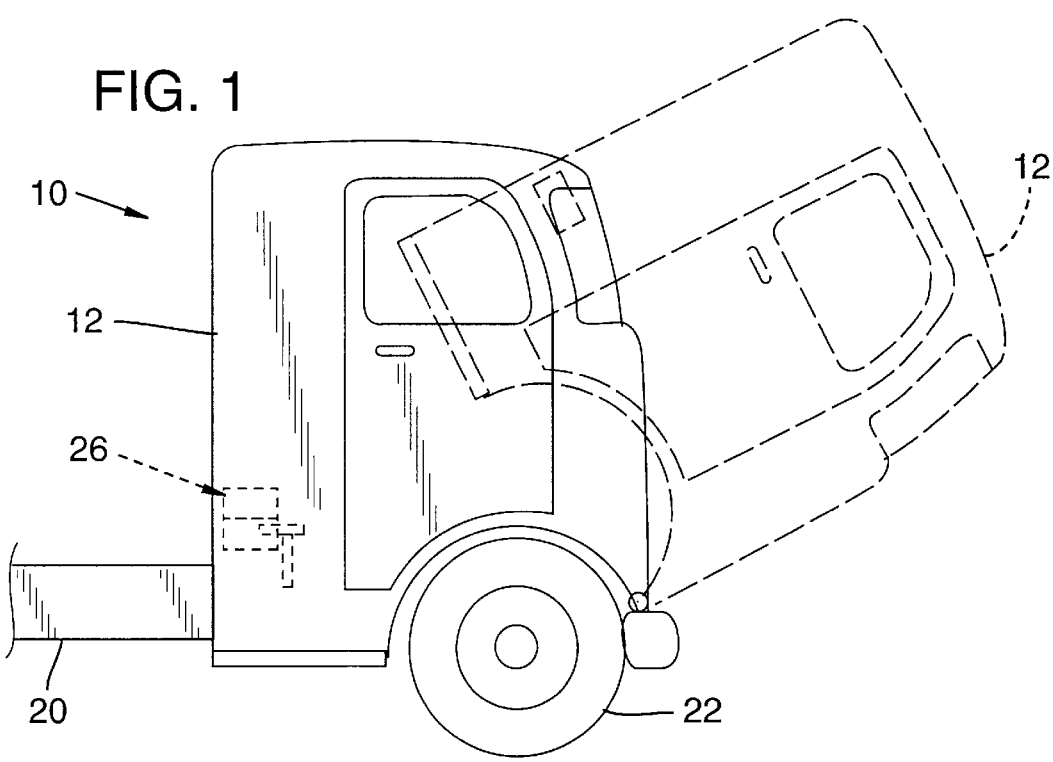
FIG. 1 is a side elevation view of the cab-over engine truck with the cab shown in solid outline in operative position and in dashed outline in tilted position to provide access to mechanical components.
Figure 2:
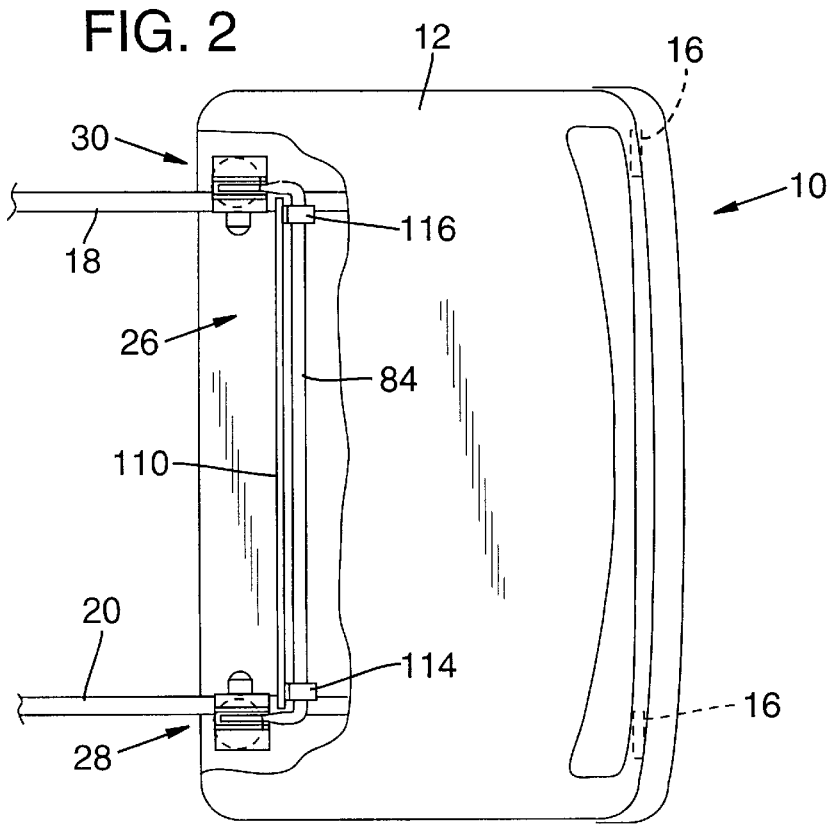
FIG. 2 is top plan view of said truck with a rear portion thereof broken away to illustrate schematically a suspension system according to the present invention.

With reference to FIG. 1, a vehicle 10, in this case a cab-over engine truck, is illustrated with the cab 12 thereof shown in solid outline in its normal operative position, and in dashed outline tilted forwardly about a pivot 16 permitting access to mechanical apparatus under the cab.

The cab is mounted on an elongate frame comprising a pair of laterally spaced, parallel, horizontal elongate frame rails 18, 20 which mount wheels, such as that indicated generally at 22.

In an effort to make the ride for the operator more comfortable the rear end of cab 12 is supported on a cushioning suspension system adjacent the rear end of the cab indicated generally at 26. The suspension system includes a right side suspension assembly 28 adjacent rail 20, and a left side suspension assembly 30 adjacent frame rail 18. Since each of these suspension assemblies are substantially mirror images of each other assembly 30 will be described in detail, with the understanding that assembly 28 is substantially similar.

Figure 3:
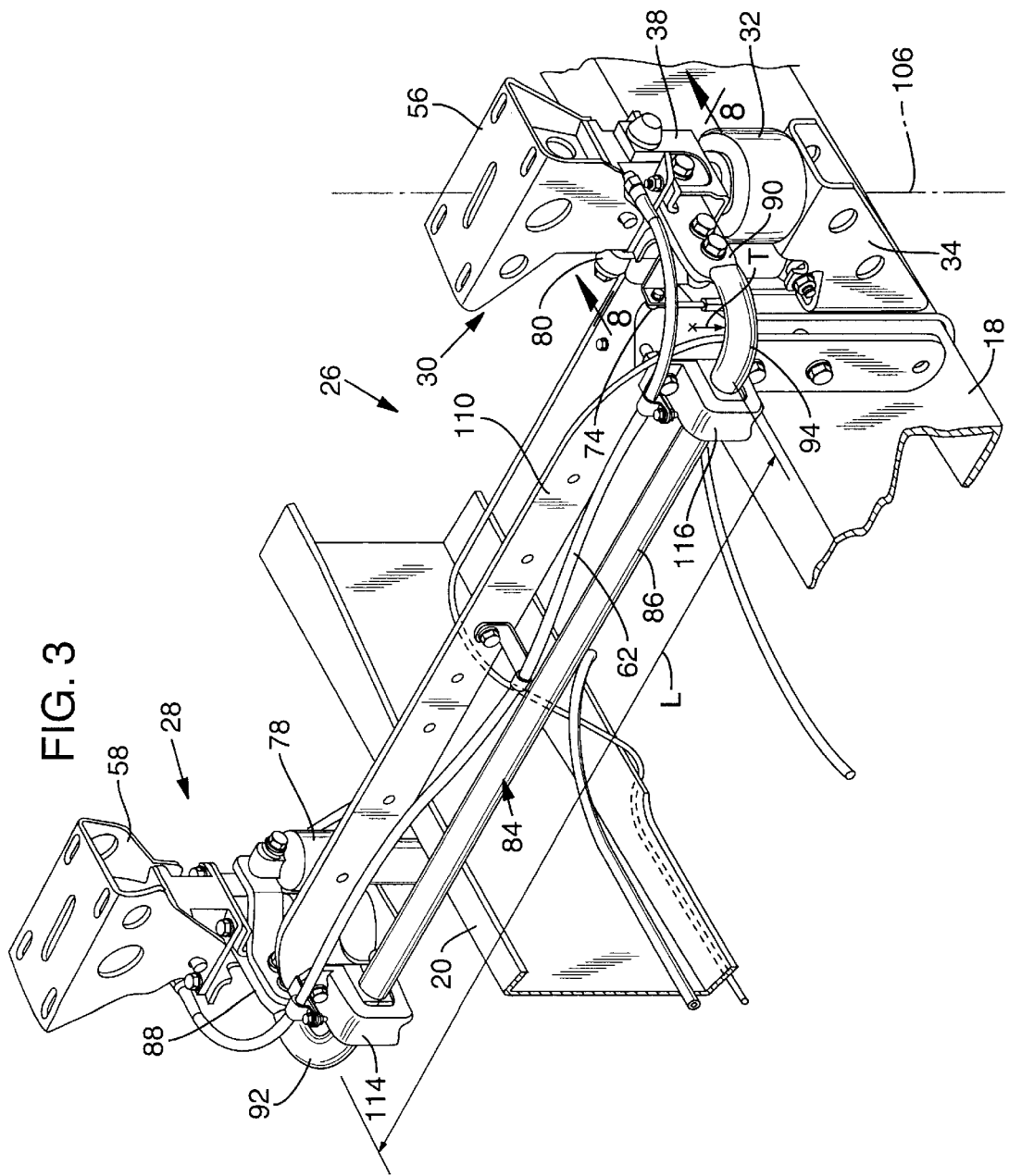
FIG. 3 is an enlarged isometric view of a suspension system for the cab according to an embodiment of the invention, with cab support structure in the suspension system in a locked together condition for maintaining the cab in the operating position illustrated in solid outline in FIG. 1.
Figure 4:
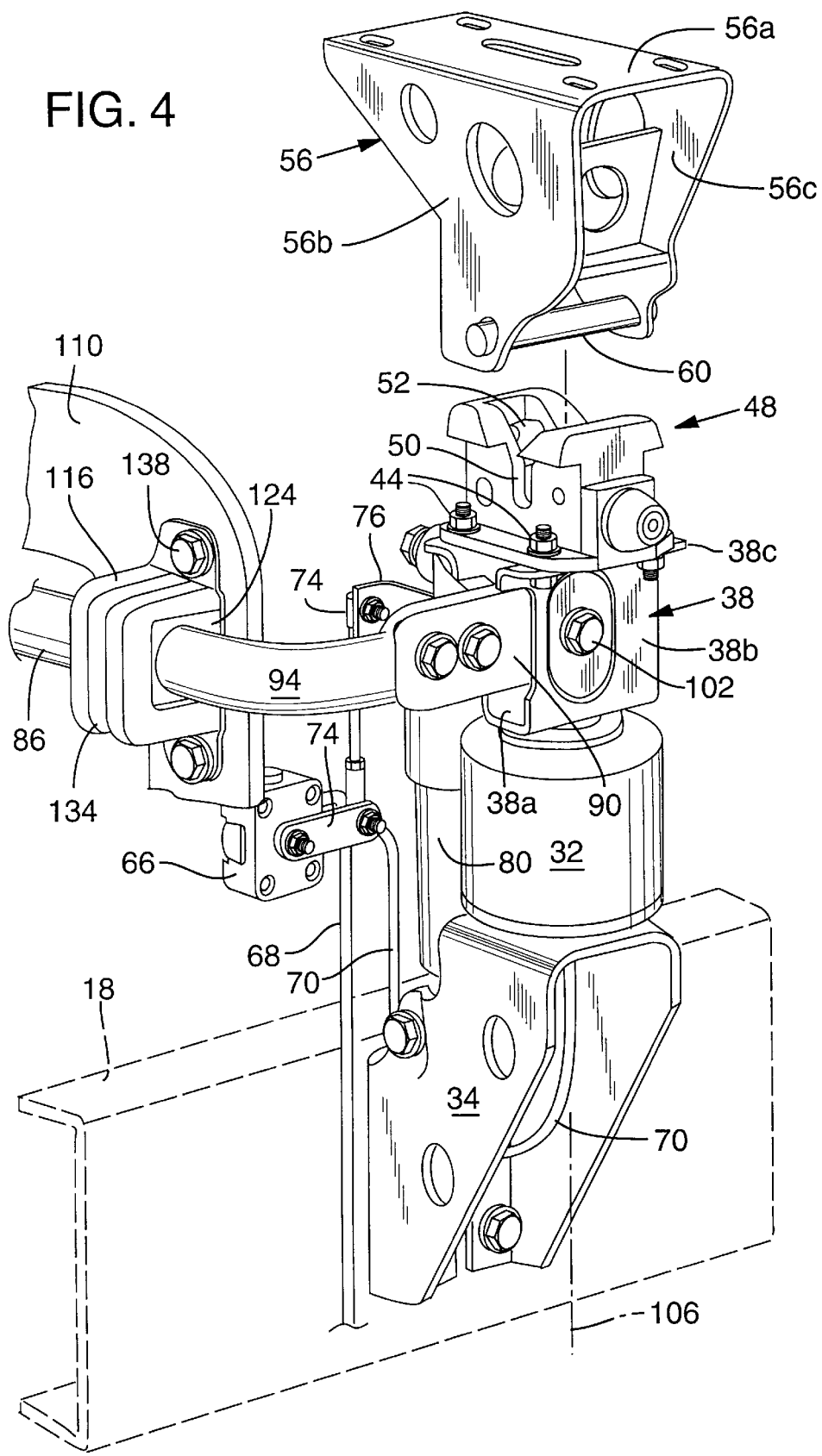
FIG. 4 is an enlarged isometric view of one side portion of the suspension system illustrated in FIG. 3 with latch mechanism therein released permitting a support for the cab to the separated (raised) from remainder portions of the suspension system to permit tilting of the cab as illustrated in dashed outline in FIG. 1.

Referring to FIGS. 3 and 4, an inflatable air bag style spring 32 is supported atop a bracket 34 secured to the outer side of frame rail 18. The air bag illustrated in this embodiment is approximately 105 mm (4.13 in) high, with a diameter of approximately 125 mm (4.9 in) manufactured by Firestone Industrial Products. It is designed to be inflated to no more than 150 psi.

Figure 8:
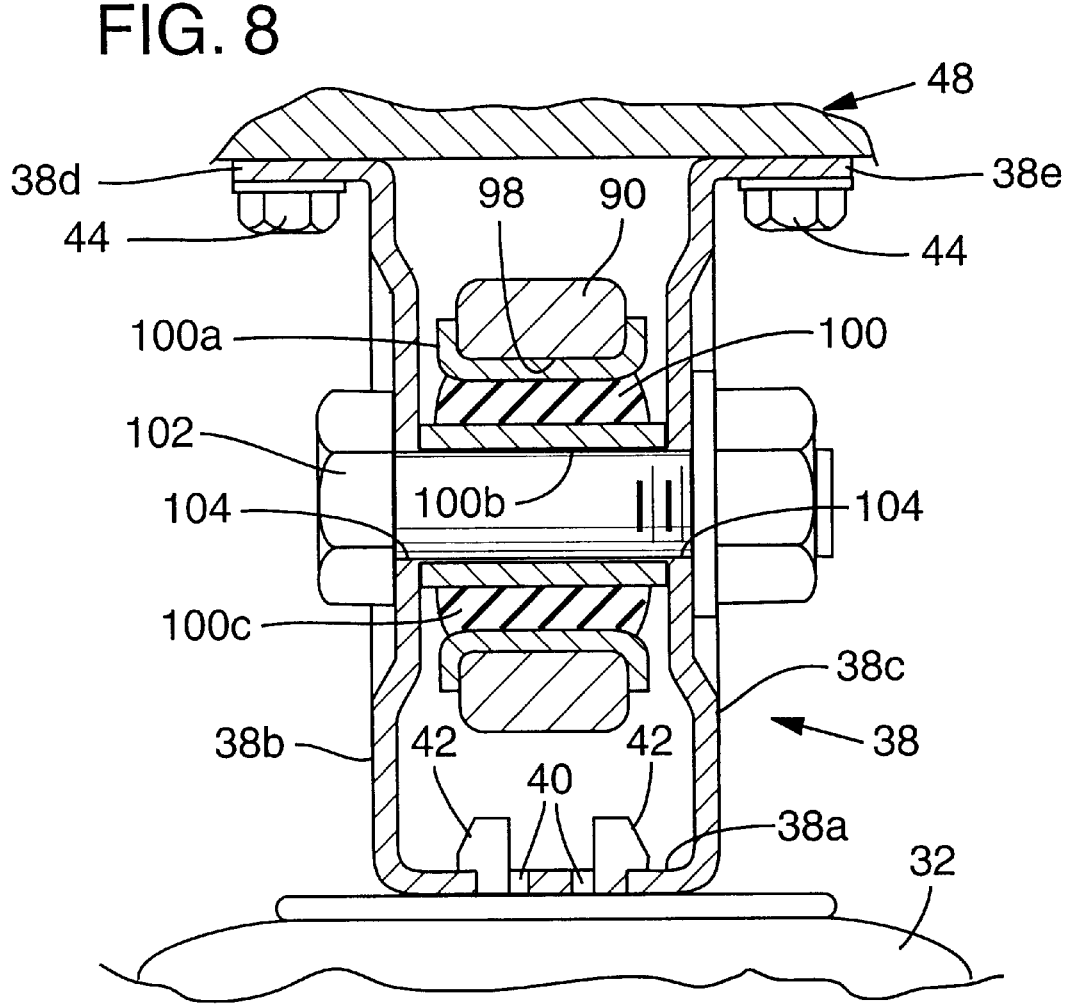
FIG. 8 is an enlarged cross sectional view taken generally along the line 8—8 in FIG. 3.

Resting atop air bag 32 is a support bracket 38. As best seen in FIG. 8, where the bracket 38 is illustrated in enlarged cross section, the bracket is a somewhat U-shaped channel member having a substantially horizontal bottom 38a, a pair of laterally spaced upstanding sides 38b, 38c and at the top of such sides a pair of outwardly projecting flanges 38d, 38e. The bottom 38a has at least a pair of slots 40 extending therethrough.

The top of airbag 32 has a pair of arrowhead-shaped tabs 42 which extend upwardly through slots 40 and are biased outwardly from each other to releasably secure the support 38 bracket to air bag 32.

Secured to flanges 38d, 38e through bolts 44, is a latch mechanism 48. Referring to FIG. 4. latch mechanism 48 has a U-shaped slot 50 formed in the top thereof. A swingable latch indicated generally at 52 is mounted within the latch mechanism having a portion which is capable of being swung from a first, retracted, unlatched position as illustrated in FIG. 4 to a second, latched, operative position overlying the bottom of slot 50. Although not illustrated in detail here, this latch mechanism is hydraulically actuated to swing the latch 52 under power between its first, open position, as illustrated in FIG. 5, to its second, or latched position, overlying the bottom of slot 50.

A cab-mounting bracket, or support member, 56 is adapted to be secured, as by bolts, to the underside of cab 12 adjacent the left side of the cab. A similar cab mounting bracket, or support member, 58 associated with suspension assembly 28 adjacent the opposite side rail is adapted to be secured, as by bolts, to the underside of the opposite, or right, side of the cab.

Describing bracket 56 in greater detail, it has a substantially horizontal upper plate portion 56a and a pair of laterally spaced, substantially parallel depending leg portions 56b, 56c. A latch pin 60 extends between and is connected at its opposite ends to the lower portions of legs 56b, 56c. The latch pin 60 is adapted to move downwardly into slot 50 of the latch mechanism, rest against the bottom of such slot, and be captured by latch 52 when swung to its operative, latched position, thus to secure cab mounting bracket 56 to latch mechanism 48. The latch mechanism of suspension assembly 28 likewise secures mounting bracket 58 secured to the opposite side of the cab.

A hydraulic fluid pressure supply line 62 shown in FIG. 3 is connected to the latch 48 in both of suspension systems 26, 28, such that the application, or release, of hydraulic pressure will serve to shift latch 52 in the latch mechanism between its latched and unlatched positions. In its latched position the latch engages latch pin 60 to secure the cab mounting bracket to the suspension system as shown on FIG. 3, and in its unlatched position the latch is released from the latch pin allowing the cab mounting bracket to move out of the latch mechanism as illustrated in FIG. 4, to release the cab for forward tilting.

The air bag springs in suspension systems 26, 28, such as air bag 32 are connected to a source of pressurized air to maintain a selected degree of inflation, and thus spring support. Referring to FIG. 4, a leveler valve 66 which is secured to the frame rail by an appropriate bracket, has an air pressure in-feed line 68 connecting it to a source of pressurized air (not shown) and an air out-feed line 70 which connects the leveler valve to air bag 32. A control arm 72 on the leveler valve is pivotally connected at its outer end to a linkage arm 72 which is connected through a bracket 76 to support bracket 38. The leveler valve senses the elevation of support bracket 38, and thus the elevation of its associated side of cab 12, relative to the frame rail. The leveler valve and linkage arm 74 are adjusted to maintain a selected elevation for the rear of the cab relative to the frame rails. Should the rear of the cab raise or lower beyond the selected elevation the leveler valve will either supply air to or release air from air bag 32 to return the cab to its selected elevation above the frame. It should be recognized that this is not an instantaneous action, but is more a static situation. Thus, for example, if the truck is stopped the rear of the cab generally will be at the selected elevation. As the truck begins to move at higher speeds aerodynamic forces on the front of the cab will push the cab rearwardly to compress the air bags. As this occurs the change in level will be sensed and the leveler valve will gradually feed additional air pressure into the air bags to return the cab to its selected level with sufficient air bag suspension support, to prevent "bottoming out" of the air bags in operation.

The suspension system further includes shock absorbers 78, 80 which are interconnected between the frame and support bracket 38.

Although the suspension systems thus far described provides vibration isolation between the cab and frame, without more it would not provide good side-to-side stability for the cab. For example, on rounding sharp curves or in other situations the rear end of the cab being mounted on springs, such as air bag spring 32, would have the tendency to shift laterally relative to the frame and/or roll side-to-side about the longitudinal axis of the truck. Some means to resist, or minimize, this side-to-side lateral shifting and roll is required.

To provide this added stabilizing feature, the present invention includes a sway resisting device comprising of a torsion, or sway, bar indicated generally at 84 extending transversely of the frame. The torsion bar has an elongate central section 86 and a pair of opposed, leg section 88, 90 rigidly secured thereto and extending outwardly therefrom at a substantial angle. Leg sections 88, 90 are substantially horizontal and parallel and are connected to central section 86 by curved transition sections 92, 94. In one specific example of the invention the torsion bar is a monolithic element made of ASTM/304-4140 hr steel having a diameter of about 35 mm (1.38 in). The length "L" of the central section is approximately 1,055 mm (41.5 in) and leg sections 88, 90 are approximately 250 mm (9.85 in) long. Transition sections 92, 94 are formed in bends with a radius "T" of approximately 50 mm (2.0 in). The leg sections are forged into substantially flat sections having a thickness of approximately 16 mm (0.63 in) and a height of approximately 60 mm (2.4 in). The sway bar thus forms a shallow U-shape. The legs are fairly rigid relative to the central portion, such that they do not flex easily toward and away from each other, laterally of the frame.

As is best illustrated in FIG. 8, the outer end portion of each of legs 88, 90 has a bore 98 extending therethrough in which is secured a bushing 100. The bushing has metallic inner and outer ring elements 100a, 100b and a rather stiff elastomeric layer 100c therebetween. A bushing found to work well in the illustrated embodiment is a Clevite bushing No. 234761. A bolt 102 extends through bushing 100 and through aligned holes 104 in support bracket 38 to pivotally connect the outer end portions of the legs of torsion bar 84 to the support brackets. The opposite ends of the inner ring 100b abut sides 28b, 38c to secure support 38 against lateral movement relative to leg section 90.

A substantially upright axis 106 (see FIG. 3), also referred to herein as a line-of-action, extends upwardly through the center of air bag 32 and through cab mounting bracket 56. The outer end portion of the leg section of the torsion bar, its bushing, and bolted interconnection with the support bracket also are aligned on axis, or line-of-action, 106.

An inverted U-shaped cross member 110 is secured adjacent its opposite ends to frame rails 18, 20 and extends transversely thereabove. Torsion bar 84 is coupled to cross member 110 through mountings 114, 116. These mountings are similar, and thus only one will be described in detail.

Referring to FIGS. 5, 6 and 7, in FIG. 5 bar 84 is illustrated in dashed line and in solid line in the other figures. A pair of split ring collars, such as that illustrated at 120 in FIG. 5, are secured to opposite end regions of central section 86 of the sway bar by being clamped thereon by screws 122. The collars are secured against movement on bar 84.

A formed, block-like bushing 124 is split along a line 126 so that it may be opened up to receive bar 84 and collar 120. The bushing has a bore 128 extending therethrough sized to receive bar 84. In the axial center of bushing 124 a groove, or cavity, 130 is formed having opposed side-walls 130a, 130b. These side-walls, or side margins, confine the bushing and collar 120 and thus bar 84 against movement laterally relative to each other.

The bushing has a block-like central portion 124a of a selected height and length. Side portions, or protrusions, 124b, 124c project laterally outwardly to opposite sides of central body portion 124a and have lesser height and length than central section 124a. This provides opposed substantially parallel upright shoulders 124d, 124e at opposite sides of central section 124a. Centrally disposed bumper projections 124f, 124g extend longitudinally of the central portion of 124a. Bushing 124 may be formed of urethane 90D (Shore A).

A somewhat U-shaped housing 134 has a main body portion 134a with an internal configuration complementary to the exterior of bushing 124. Openings, such as that indicated generally at 134b adjacent opposite sides slidably receive side portions, or protrusions, 124b, 124c. As best seen in FIGS. 6 and 7, the interior cavity of housing 134 is slightly longer than bushing 124 and slidably receives bushing 124 to permit a limited amount of shifting of bushing 124 fore and aft, longitudinally of the frame. The interior of housing section 134a has side walls, or side margins 134c, 134d positioned to engage and restrain side-to-side shifting of shoulders 124d, 124e respectively on the bushing. Bolts 138 secure housings 134 to cross member 110 in the positions illustrated in FIG. 3, adjacent the opposed frame rails 18, 20 and adjacent opposite ends of central section 86 of bar 84.

With the bar 84 mounted in housings 114, 116 the bar is able to rotate about the longitudinal axis of central section 86 of the bar to allow suspension assemblies 26, 28 to move up and down relative to frame rails 18, 20 to provide vibration isolation and damping between the cab and the frame rails for operator comfort. However, should the rear end of the cab be urged to shift laterally toward one side or the other, the collars 120 frictionally secured to the bar and restrained against movement by bushings 124 and housings 134 inhibit movement of the bar laterally of the truck frame and thus the connections of their leg sections with brackets 38 of the suspension systems 26, 28 inhibit lateral shifting of the cab.

Further, should the cab be urged to roll side-to-side about its longitudinal axis, such that one side of the rear of the cab would tend to move vertically relative to the opposite side of the cab the torsion bar will produce torsional resistance to such and will inhibit side-to-side roll. Explaining further, if the cab should tend to roll to raise cab mounting bracket 56 on one side and depress bracket 58 at the opposite side the torsional rigidity of bar 84 would resist this change in relative elevation change to minimize, or moderate, such roll.

Since the end portions of the leg sections are connected directly to mounting brackets 38 in the opposed suspension assemblies 26, 28 the bar may swing in an arc about the longitudinal axis of the central section of the bar to permit concurrent vertical movement of both sides of the cab. Some movement must be allowed for a portion of the bar due to the rotation and arcuate movement of the leg sections. This arcuate movement of the bar is permitted by the limited amount of shifting of bushing 124 in housing 134 as described above.

Having illustrated and described the principals of the invention with reference to a preferred embodiment, it should be apparent to those of ordinary skill in the art that the invention may be changed in arrangement and detail without departing from the inventive principles thereof. Claimed as the invention herein are all such modifications which fall within the scope of the following claims.

I claim:

1. In a vehicle having an elongate frame and a cab overlying the frame, a suspension system for supporting the cab on the frame comprising, a pair of laterally spaced springs mounted adjacent opposite sides of the frame on which springs the cab is supported, a sway resisting device operable to resist vertical movement of one side of the cab relative to the other side of the cab and to inhibit lateral movement of the cab relative to the frame, the sway resisting device comprising a torsion bar having an elongate central section extending transversely of the frame and opposed leg sections secured to and extending at substantial angles outwardly from opposite ends of said central section, with outer end portions of said leg sections interposed between said springs and the cab and coupled to the cab during operation, and a mounting coupling the torsion bar to the frame.

2. The vehicle of claim 1, wherein said torsion bar is formed in a shallow U-shape and said leg sections extend outwardly in a common direction from the central section and are disposed substantially parallel to each other.

3. The vehicle of claim 1, wherein said mounting comprises a bushing having a bore through which a portion of said central section extends and a housing in which said bushing is mounted, said housing being secured relative to said frame and said bushing being mounted in said housing to permit a limited amount of shifting longitudinally of the frame to accommodate movement of the torsion bar during operation.

4. The vehicle of claim 1, wherein said torsion bar has at least one projection on the central section thereof, said mounting comprises a bushing having a bore through which a portion of said central section extends and a groove positioned to receive said projection, said groove having laterally spaced side margins confining said projection and torsion bar against movement laterally of the frame, and a housing secured relative to said frame in which said bushing is mounted.

5. The vehicle of claim 4, wherein said projection comprises a collar secured to and surrounding a portion of said central section.

6. The vehicle of claim 4, wherein said bushing is mounted in said housing to permit a limited amount of shifting longitudinally of the frame to accommodate movement of the torsion bar during operation.

7. The vehicle of claim 6, wherein said bushing is mounted for sliding movement in said housing longitudinally of the frame.

8. The vehicle of claim 1, wherein one side of said cab is supported on one of said springs and the opposite side of the cab is supported on the other of said springs, first and second support members secured to the cab are interposed between the springs and the cab, and one end portion of the torsion bar is secured to said first support member and the other end portion of the torsion bar is secured to said second support member.

9. The vehicle of claim 8, wherein a substantially upright line-of-action extends upwardly through one of said springs and one of said support members, and an end portion of the torsion bar is secured to the support member along said line-of-action.

10. The vehicle of claim 8, which further comprises a latch operable in a first operating condition to couple said one cab side to its associated support member and in a second condition to release said one cab side from its associated support member.

11. The vehicle of claim 1, wherein a spring comprises an inflatable air bag.

12. The vehicle of claim 1, wherein said torsion bar comprises a monolithic element having selected torsional resistance characteristics to inhibit vertical movement of one side of the cab relative to the other side of the cab.

13. The vehicle of claim 1, wherein said leg sections extend substantially horizontally from said central section.

14. The vehicle of claim 1, which further comprises restraining means operable to inhibit movement of the torsion bar laterally of the frame.

15. The vehicle of claim 1 wherein said leg sections are coupled to said cab to restrain movement of the cab laterally relative to said leg sections.

16. The vehicle of claim 1, wherein the cab is pivotally connected adjacent a forward end portion thereof to a forward end portion of the frame to permit pivoting of the cab between a first operating position and a second tilted forward position, and said springs are positioned to support a rear end portion of the cab when the cab is in its first position.

17. In a vehicle having an elongate frame and a cab overlying the frame, a suspension system for supporting the cab on the frame comprising, springs mounted on the frame on which springs the cab is supported, a sway resisting device operable to resist vertical movement of one side of the cab relative to the other side of the cab and to inhibit lateral movement of the cab relative to the frame, the sway resisting device comprising a monolithic torsion bar formed in a shallow U-shape having an elongate central section extending transversely of the frame and opposed leg sections extending in a common direction at substantial angles outwardly from opposite ends of said central section, with outer end portions of said leg sections interposed between said springs and the cab and coupled to the cab during operation, and a mounting coupling the torsion bar to the frame comprising a bushing having a bore through which a portion of said central section extends and a housing in which said bushing is mounted, said housing being secured relative to the frame and said bushing being mounted in said housing to permit a limited amount of shifting longitudinally of the frame to accommodate movement of the torsion bar during operation.

18. The vehicle of claim 17, wherein one side of said cab is supported on one of said springs and the opposite side of the cab is supported on the other of said springs, first and second support members are interposed between the springs and the cab, and one end portion of the torsion bar is secured to said first support member and the other end portion of the torsion bar is secured to said second support member.

19. The vehicle of claim 18, wherein a substantially upright line-of-action extends upwardly through one of said springs and one of said support members, and an end portion of the torsion bar is secured to the support member along said line-of-action.

20. The vehicle of claim 19, wherein said torsion bar has at least one projection on the central section thereof, and said bushing has a groove formed therein positioned to receive said projection, said groove having laterally spaced side margins confining said projection and torsion bar against movement laterally of the frame.

21. The vehicle of claim 20, wherein said projection comprises a collar secured to and surrounding a portion of said central section.

22. The vehicle of claim 17, wherein the cab is pivotally connected adjacent a forward end portion thereof to a forward end portion of the frame to permit pivoting of the cab between a first operating position and a second tilted forward position, and said springs are positioned to support a rear end portion of the cab when the cab is in its first position.

23. In a vehicle having an elongate frame and a cab mounted thereon, a suspension system interposed between the cab and frame comprising springs interposed between the frame and cab and supporting opposite sides of the cab, an elongate torsion bar extending transversely of the frame with opposite ends thereof adjacent opposite sides of the cab, a mounting coupling the torsion bar to the frame, permitting rotation of the torsion bar about an axis extending laterally of the frame, a pair of spaced elongate connecting legs secured to and extending at substantial angles outwardly from the torsion bar adjacent opposite sides of the cab, said legs being coupled adjacent their distal ends to the cab, said torsion bar and connecting legs being operable to resist vertical movement of one side of the cab relative to the opposite side of the cab.

24. The vehicle of claim 23, wherein said connecting legs are rigidly secured to said torsion bar, said torsion bar has a radially extending projection thereon, and said mounting comprises a bushing having a bore through which a portion of the torsion bar extends and a groove positioned to receive said projection, said groove having laterally spaced side margins confining said projection and torsion bar against movement laterally of the frame, and a housing secured relative to the frame in which said bushing is mounted.

25. The vehicle of claim 23 wherein said connecting legs are rigidly secured to said torsion bar, said torsion bar is restrained against movement laterally of the frame, and said cab is restrained against movement laterally of the legs to inhibit shifting of the cab laterally of the frame.

26. The vehicle of claim 23, wherein the cab is pivotally connected adjacent a forward end portion thereof to a forward end portion of the frame to permit pivoting of the cab between a first operating position and a second tilted forward position, and said springs are positioned to support a rear end portion of the cab when the cab is in its first position.

* * * * *